(12) United States Patent
Jin

(10) Patent No.: US 6,791,942 B2
(45) Date of Patent: Sep. 14, 2004

(54) DYNAMIC ETHERNET POWER MANAGEMENT

(75) Inventor: Yucheng Jin, Chalfont, PA (US)

(73) Assignee: General Instrument Corporation, Horsham, PA (US)

(*) Notice: Subject to any disclaimer, the term of this patent is extended or adjusted under 35 U.S.C. 154(b) by 205 days.

(21) Appl. No.: 09/885,785

(22) Filed: Jun. 20, 2001

(65) Prior Publication Data

US 2002/0196736 A1 Dec. 26, 2002

(51) Int. Cl.[7] .................................................. H04J 3/16
(52) U.S. Cl. ........................................ 370/229; 370/465
(58) Field of Search ................................. 370/466, 252, 370/348, 401, 229, 230, 235, 465

(56) References Cited

U.S. PATENT DOCUMENTS

| | | | | |
|---|---|---|---|---|
| 5,596,575 A | * | 1/1997 | Yang et al. | 370/468 |
| 5,673,254 A | | 9/1997 | Crayford | 370/231 |
| 5,907,553 A | * | 5/1999 | Kelly et al. | 370/433 |
| 6,198,727 B1 | * | 3/2001 | Wakeley et al. | 370/247 |
| 6,359,893 B1 | * | 3/2002 | Mills | 370/402 |
| 6,442,174 B1 | * | 8/2002 | Lin | 370/466 |
| 6,457,055 B1 | * | 9/2002 | Hwong et al. | 709/227 |
| 6,507,591 B1 | * | 1/2003 | Bray | 370/501 |
| 6,529,957 B1 | * | 3/2003 | Joergensen | 709/233 |
| 6,538,994 B1 | * | 3/2003 | Horspool et al. | 370/230 |

* cited by examiner

Primary Examiner—Kenneth Vanderpuye
(74) Attorney, Agent, or Firm—Mayer Fortkort & Williams, PC; Michael P. Fortkort; Karin L. Williams

(57) ABSTRACT

To reduce power consumption of a communications interface between a network and a processor, a method for controlling the interface monitors data traffic from sides of the interface. Upon detecting a predetermined period of no data traffic on both sides, the method disables an auto-negotiation mode of the interface and forces the interface to operate at its lowest speed. Prior to changing speed, the method may briefly remove a link signal or electrically isolate the network and the network interface to allow a peer to adapt to a new speed. When in the low speed mode, the method monitors data on both the processor side and the network side. Upon detecting a predetermined and configurable amount of data, the method enables the auto-negotiate mode. Prior to increasing the speed, the method may briefly remove a link signal to allow a peer to adapt to the new speed. Hysteresis may be included to prevent a speed change if a predetermined period has not occurred since a last speed change. The speed mode can be changed without disabling auto-negotiation by forcing the controller to advertise a specific speed and then forcing re-auto-negotiation. For multiple speed modes, switching occurs to a lower speed mode if detected activity lies below a threshold for a predetermined period in both input and output counters, and to a higher speed mode if detected activity in either one of the input and output counters exceeds a predetermined threshold for a predetermined period. An apparatus and computer readable media for performing the above methods are also disclosed.

28 Claims, 4 Drawing Sheets

DYNAMIC ETHERNET POWER MANAGEMENT

BACKGROUND OF THE INVENTION

The present invention relates generally to methods and apparatuses for interfacing with networks, and more particularly to a method and apparatus for interfacing with a network, such as an Ethernet, which permits multiple data rates for traffic on the network.

There are many devices for interfacing with a cable network. One example is a Broadband Telephony Interface (BTI). In the BTI product, as well as many other Broadband Communications products, an Ethernet port is provided for high speed data transfer to and from a personal computer (PC) or the like. The BTI product provides a high-speed connection to the cable plant and multiple telephony ports as well. As the BTI enters its second generation, a 10/100 Base T Ethernet port is standard. This Ethernet port is capable of transmitting and receiving data at 10 Mbps or 100 Mbps speed. Normally, the actual speed is only limited by is peer, i.e., the other device to which it is communicating. For instance, if the BTI is connected to a computer that is equipped with a 10/100 Base T Network card, the two sides will automatically negotiate to use the higher speed. If the computer is equipped with a 10 Base T network card, the two sides will negotiate to use the 10 Mbps that is common to both. The BTI is always enabled for 100 Mbps operation for best performance. The same scenario applied to most other products, including the Surf Board cable modem product line.

From a performance and marketing point of view, it is natural to want to operate the Ethernet port at its maximum speed whenever possible, i.e., as long as the peer supports 100 Mbps, for example. However, operating the Ethernet port in 100 Mbps mode requires significantly more power, thereby decreasing a length of time the device can be powered by batteries, and concomitantly decreasing the number and types of applications to which these products may be applied. Furthermore, as energy costs continue to rise and energy sources remain constant, pressure builds to reduce and conserve energy. Moreover, as networks have become ubiquitous in today's society, these devices will become potentially significant consumers of energy.

The present invention is therefore directed to the problem of developing a method and apparatus for reducing the power consumed by network interface devices without sacrificing performance in the communications process.

SUMMARY OF THE INVENTION

The present invention solves these and other problems by providing a method and apparatus for controlling the operating speed of the interface so that it operates at a minimum power consuming speed, except when transmitting data.

According to an exemplary embodiment of a method for controlling an interface between a processor and a network, the embodiment monitors data traffic from both a processor side and a network side. Upon detecting a predetermined period of no data traffic on both sides, the embodiment disables an auto-negotiation mode of the interface, and forces the interface to operate at its lowest speed. Alternatively, the embodiment may force the interface to auto-negotiate a lower speed by not advertising its high-speed capability. The embodiment may also briefly remove a link signal to allow a peer to adapt to a new speed prior to changing speed.

Once in the low speed mode, the embodiment monitors data on both the processor side and the network side. Upon detecting a predetermined and configurable amount of data, the embodiment enables the auto-negotiate mode. Again, prior to switching speeds, the embodiment may briefly removes a link signal to allow a peer to adapt to a new speed. Hysteresis may also be included in the embodiment to prevent a speed change if a predetermined period has not occurred since a last speed change.

According to another embodiment of a method for controlling an interface between a processor and a network, the embodiment monitors data traffic from both a processor side and a network side, and upon detecting a predetermined period of no data traffic on both sides, forces the interface to operate at its lowest speed. According to this embodiment, the speed is switched without disabling the auto-negotiation mode. One technique for switching without disabling the auto-negotiation mode includes forcing an Ethernet controller to advertise a specific speed and forcing a re-auto-negotiation.

According to another embodiment of a method for controlling a communications interface, the embodiment monitors a counter on an input side of the communications interface and monitors a counter on an output side of the communications interface. The embodiment switches to a lower speed mode if detected activity lies below a first threshold for a first predetermined period in both the input and output counters, and switches to a higher speed mode if detected activity in either one of the input and output counters exceeds a predetermined threshold for a second predetermined period. This embodiment can be applied to a communications interface that utilizes multiple speed modes. In the multiple speed mode application, switching to a lower speed mode operates by switching to a next lower speed mode of the multiple speed modes if not already in a lowest speed mode, and switching to a higher speed mode operates by switching to a next higher speed mode if not already in a highest speed mode.

According to another aspect of the present invention, an apparatus for performing the above methods includes a process, memory, a network interface and input an output counters. The memory stores instructions for execution by the processor. The network interface is coupled to an input and output data line and provides incoming and outgoing data signals. The input counter counts a number of incoming data packets and the output counter counts a number of outgoing data packets. The processor is coupled to the memory, the network interface, the input and output counters, and executes the instructions stored in the memory, and increments the input and output counters based on data packets present in said incoming and outgoing data signals, respectively, from the network interface. The processor further switches to a lower speed mode if detected activity lies below a first threshold for a first predetermined period in both the input and output counters and switches to a higher speed mode if detected activity in either one of the input and output counters exceeds a second predetermined threshold for a second predetermined period.

According to another aspect of the present invention, a computer readable media includes programming instructions encoded thereon causing a processor to monitor a counter on an input side of the communications interface and monitor a counter on an output side of the communications interface, and switch to a lower speed mode if detected activity lies below a first threshold for a first predetermined period in both the input and output counters, and switch to a higher speed mode if detected activity in either one of the input and output counters exceeds a second predetermined threshold for a second predetermined period.

DETAILED DESCRIPTION

Figure 1:
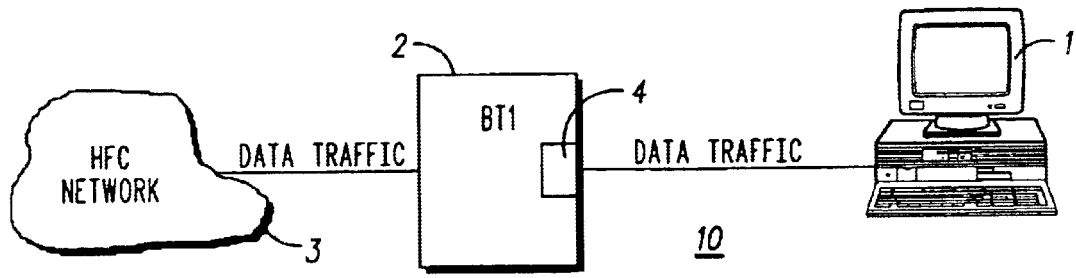
FIG. 1 depicts a block diagram of an exemplary embodiment according to one aspect of the present invention.

It is worthy to note that any reference herein to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The present invention finds application inter alia in the Broadband Telephony Interface (BTI) version 2.0. Subsequent versions may also be applicable. The present invention can be incorporated into products requiring a 10/100 Base T Ethernet port, particularly those in which power savings is a concern. Moreover, the present invention can be applied to any network communication device that operates at more than one connection speed.

The present invention provides a significant reduction in power consumption, with little or no cost and performance impact. The embodiments herein provide an intelligent way of managing an Ethernet port speed to achieve power savings without impacting hardware and performance criteria. The present invention relates to Data Over Cable System Interface Specification (DOCSIS) cable modems and to voice over Internet Protocol (IP) networks.

To achieve significant power reductions without impacting performance or requiring hardware modifications, the embodiments herein dynamically control the Ethernet port speed, thereby reducing power. The present invention runs counter to most conventional applications that prefer to operate the Ethernet port speed at its highest speed. In contrast, the present invention attempts to control the Ethernet port so it operates at its lowest speed, even if it and its peer are capable of operating at higher speeds, during the BTI idle mode, to save power. As this modification operates in the idle mode, no performance reduction will be experienced. Moreover, operating the Ethernet port speed at low speeds during the idle mode also maintains the data path, thereby ensuring no interruption in service availability.

According to an exemplary embodiment of the present invention, when in normal mode, if the BTI detects data absence from both the cable plant side and the personal computer (PC) side for a predetermined time, which is firmware configurable, the BTI enters the idle mode. This disables the Ethernet speed auto-negotiation function and forces the Ethernet port to operate at 10 Megabits per second (Mbps), which is a lower power consumption mode. When in the idle (10BaseT) mode, if the BTI detects a predetermined amount of data destined to ether direction, which is also firmware configurable, the BTI enters the normal mode. This enables the auto-negotiation function of the Ethernet port to allow the port to operate at the highest speed supported by the BTI and its peer. Furthermore, the management of the Ethernet port speed can be completely implemented in firmware, requiring no additional hardware costs.

The above embodiments can be applied to other products equipped with a speed switchable high-speed communications port. Examples of such products include the Home Phoneline Network Association (HPNA) port, which includes a 1 Mb mode and a 10 Mb mode, and a Universal Serial Bus (USB) port, which includes a 1.5 Mb mode and a 12 Mb mode.

In the BTI product, as well as many other high speed communications products, an Ethernet port is provided for high speed data transfer to and from a personal computer (PC) or the like. As the BTI enters its second generation, a 10/100 Base T Ethernet port is standard. Such Ethernet port is capable of transmitting and receiving data at 10 Mbps or 100 Mbps speed. Normally, the actual speed is only limited by its peer. For instance, if the BTI is connected to a computer that is equipped with a 10/100 Base T Network card, the two sides will automatically negotiate to use the higher speed. If the computer is equipped with a 10 Base T network card, the two sides will negotiate to use the 10 Mbps that is common to both. The BTI is always enabled for 100 Mbps operation for best performance. The same scenario applied to most other products, including the Surf Board cable modem product line.

From a performance and marketing point of view, it is natural to want to operate the Ethernet port at its maximum speed whenever possible, i.e., as long as the peer supports 100 Mbps. However, operating the Ethernet port in 100 Mbps mode bears a significant power savings hit.

The dilemma can be solved by the present invention. Because of the nature of this product, i.e., the BTI operates in its idle mode (registered to the Cable Modem Terminating System (CMTS) but has no data traffic between the PC and the BTI), savings achieved for the idle mode has a key influence. The present invention tries to force the Ethernet port into low speed mode (10 Mbps) during idle to conserve power and intelligently switch back, if necessary, to the high speed mode (100 Mbps) when data traffic to or from the PC is detected.

Forcing the Ethernet port into low speed mode keeps the data path alive so service remains available to the customer. People may associate low speed with low performance but it is not the case due to these reasons: (1) the practical upstream/downstream data rate in the cable modem based BTI does not come close to 10 Mbps; and (2) the unit is in idle mode in the first place. When service is needed, the firmware intelligently re-enables the high-speed mode. When the Ethernet port operates in low speed mode, it consumes significantly lower power.

To decide what speed the Ethernet port should be in, the firmware monitors the data traffic from both the PC side and the cable plant (HFC) side. After a quiet period (which is configurable) on both sides, the firmware can turn off the Ethernet port's speed auto-negotiation mode and then force the port to run at 10 Mbps. The firmware may need to briefly remove the link signal to allow the peer to adapt to the new speed. When in low speed mode, the firmware continues monitoring the data on both HFC and PC sides. If a predetermined amount of data is detected (which is configurable), the firmware can turn on the auto-negotiate mode. The firmware may need to briefly remove the link signal to allow the peer to renegotiate a new speed. The speed negotiation takes place very quickly so no data loss should be experienced.

It is also possible to switch the speed without disabling the auto-negotiation mode. The firmware can force the Ethernet controller to advertise a specific speed and force a re-auto-negotiation.

It is important to build some hysteresis into the firmware to avoid too frequent speed changes. Keep in mind, that even in the 10Base T mode, the Ethernet port is still faster than the HFC interface, i.e., the 10BaseT mode is no the performance bottleneck and will not degrade the data performance.

The actual measurements taken from a BTI 2.0 unit shows about 250 mW power savings when the unit is forced into 10BaseT mode. The data is based on the DC powering option. With the lower-efficient AC powering options, additional savings (300 mW or higher) can be expected. Also, since the AC powering option appears to be the preferred method by the customer, the invention seems even more attractive.

FIG. 1 depicts a block diagram of an exemplary embodiment 10 of the present invention. A PC (or Hub/Switch/Router) 1 is coupled via a BTI unit 2 to an HFC network 3 or the Internet. Data traffic flows on both sides of the BTI unit 2. The BTI enables the Ethernet for high-speed operation when data traffic from the PC or HFC network is present. The BTI forces the Ethernet to run at 10 Mbps during idle to conserve power. The PC 1 is coupled to the BTI unit 2 at a 10BaseT Ethernet port 4.

Figure 2:
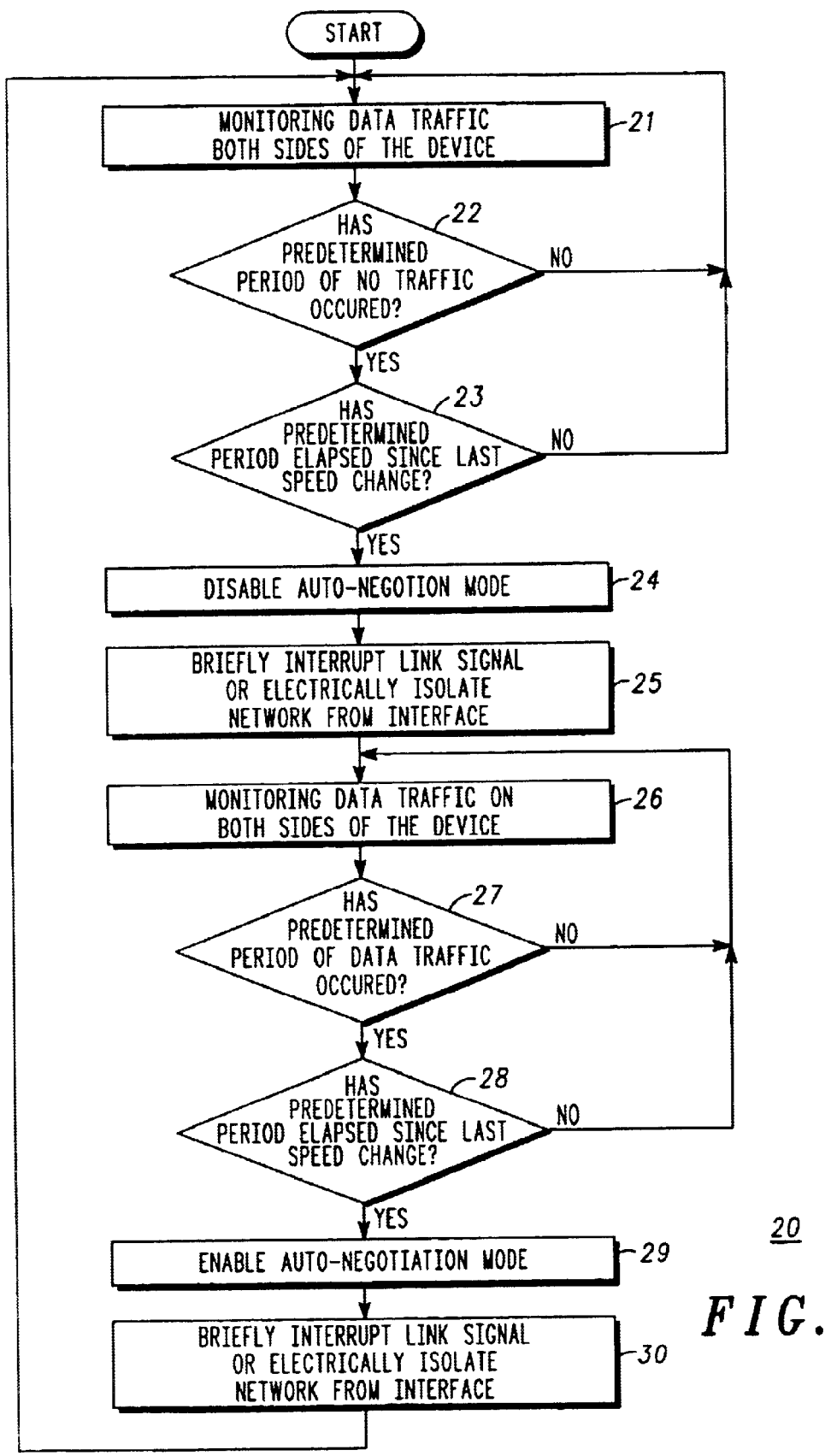
FIG. 2 depicts an exemplary embodiment of a method according to another aspect of the present invention.

FIG. 2 depicts a flow chart of an exemplary embodiment 20 of a method according to another aspect of the present invention. The embodiment 20 controls an interface between a processor and a network to minimize the energy usage of the network communications. The process 20 begins by monitoring data traffic on both sides of the interface 21, i.e., on the processor side and the network side. If a predetermined period of no data traffic on both sides exists 22, then the process disables the auto-negotiation mode of the interface 24.

One possible example of the predetermined period is six minutes. So, if no data occurs in a six-minute period, the software will switch to the lower speed, as described below. Alternative implementations of this predetermined period are also possible, depending upon the application, such as 1 minute, 2 minutes, 10 minutes, etc. The determination as to what consists of no data traffic is system configurable in firmware. Both the length of the period that a specified amount of data must flow or not flow as well as the threshold above or below which the traffic must be to trigger the disabling of the auto-negotiation mode are configurable at the system level by firmware installed in the network interface. For example, the amount of data could be a single packet in the predetermined time is sufficient to maintain the high-speed mode. Alternatively, multiple packets in the predetermined time may be required to prevent switching to the low-speed mode. Transmitting a few packets at a low-speed mode rather than the high-speed mode has little impact on the performance. Therefore, establishing a minimal amount of traffic required to maintain the high-speed mode can prevent continuous mode switching without performance degradation while saving significant amounts of power.

Once the auto-negotiation mode is disabled, the interface is forced to operate at its lowest speed. The above process may then briefly interrupt the link signal or electrically isolate the interface from the network 25 to allow a peer computer to adapt to the new communications rate. Once the system is operating in the low speed mode, the process monitors the data on both the processor side and the network side 26. Upon detecting a predetermined and configurable amount of data 27, the process enables the auto-negotiate mode 29. As before, the link signal is briefly interrupted or the network is electrically isolated from the interface 30 to allow any peer computer to adapt to the new speed. To avoid excessive speed adjustments, the process prevents a speed change if a predetermined period has not occurred since a last speed change (see steps 23 and 28). The length of the predetermined period before which another speed change is possible is also configurable in firmware. The process returns to monitoring the data traffic 21.

Figure 3:
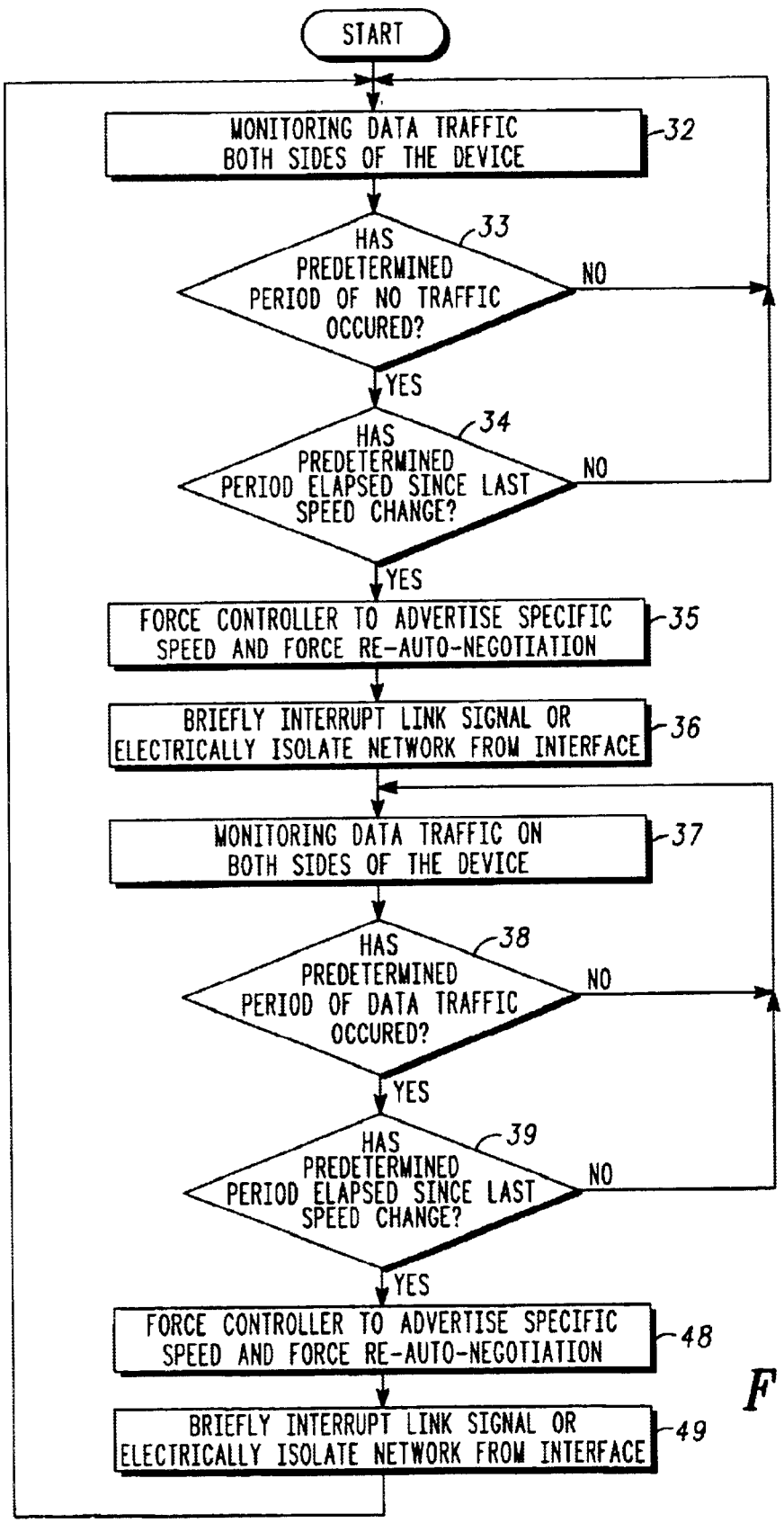
FIG. 3 depicts another exemplary embodiment of a method according to another aspect of the present invention.

FIG. 3 depicts another exemplary embodiment 31 of a method according to another aspect of the present invention. The embodiment controls an interface between a processor and a network to optimize the energy efficiency of the device in which the interface is installed. The process begins by monitoring data traffic 32 from both sides of the interface, i.e., the processor side and the network side. Upon detecting a predetermined period of little or no data traffic on both sides 33, the interface is forced to operate at its lowest speed 35. In this embodiment, the speed is switched without disabling the auto-negotiation mode. To do so, the process forces the Ethernet controller to advertise a specific speed (e.g., slower) and then forces a re-auto-negotiation (see step 35). As in the above embodiment, a speed change is prevented if a predetermined and firmware configurable period has not occurred since a last speed change 34. One technique to avoid overly frequent speed changes is to provide some hysteresis in the system response. As in the above embodiment, the link signal is briefly interrupted or the network is briefly electrically isolated from the interface 36 to allow a peer processor to adapt to a new speed. Once the system is operating in the low speed mode, the process monitors the data on both the processor side and network side 37. Upon detecting a predetermined and configurable amount of data 38, the process performs the reverse of the above (steps 39, 48 and 49). In this embodiment, the speed is again switched without disabling the auto-negotiation mode 48. To do so, the process forces the Ethernet controller to advertise a specific speed (e.g., faster) and then forces a re-auto-negotiation (see step 48). As before, the link signal is briefly interrupted or the network is electrically isolated from the interface to allow any peer computer to adapt to the new speed 49. The process returns to monitoring the data traffic 32.

To monitor the traffic, the software monitors the counter registers in the Ethernet controller of the BTI. If traffic is on either the incoming side or the outgoing side, these registers will be incremented by the amount of traffic. By detecting the amount of traffic for the predetermined interval, the software can determine whether a sufficiently quiet period has occurred to justify switching to the low-speed mode. As mentioned above, this minimum amount of traffic can be either a single packet or a long string of packets, indicating that a particularly fast connection is appropriate.

Figure 4:
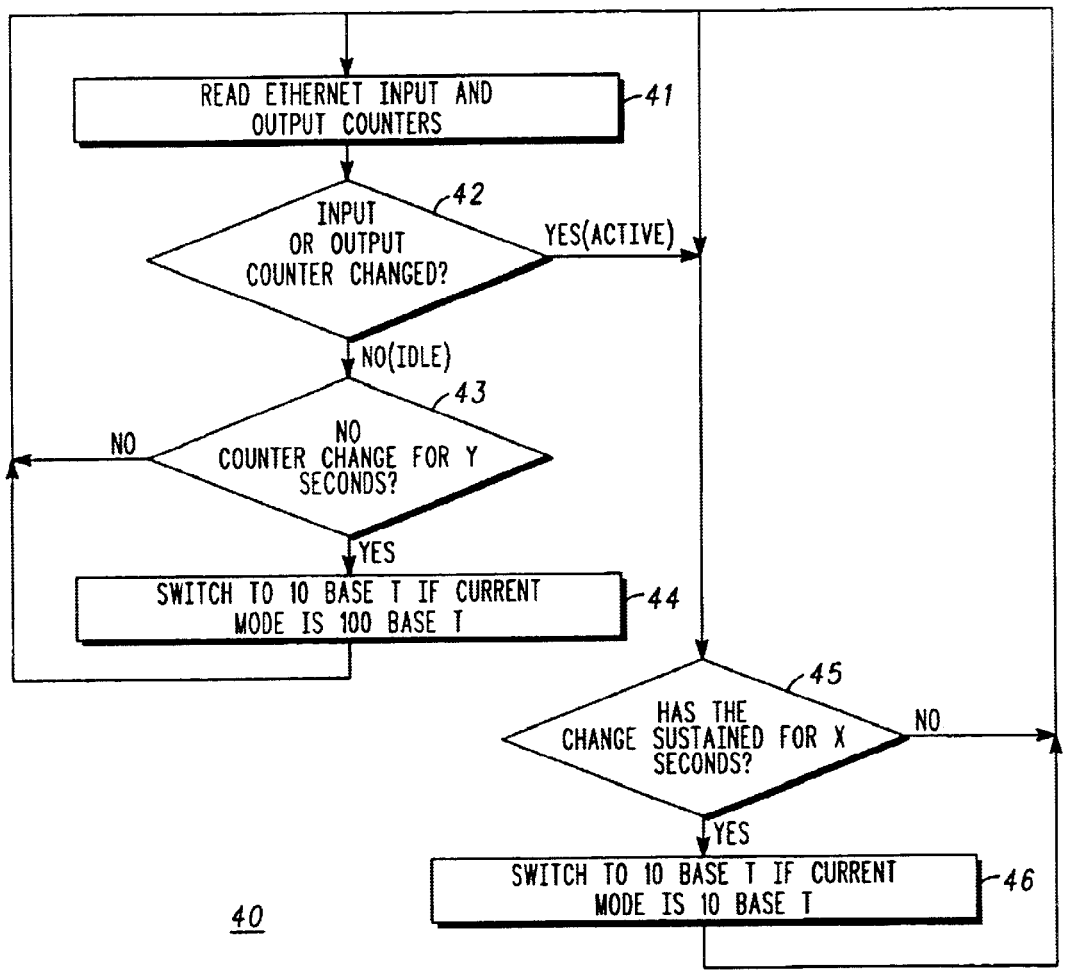
FIG. 4 depicts another exemplary embodiment of a method according to yet another aspect of the present invention.

FIG. 4 depicts yet another exemplary embodiment 40 of a method according to one aspect of the present invention. The process runs continuously during operation of the interface in which the software or firmware is installed. The process monitors the counters in the Ethernet Input and Output sides 41. If the input or output counters have changed in the last clock cycle or other predetermined period 42, then the process determines that the device must be in the active state, and then applies optional hysteresis 45, in which the software tests whether the change has sustained for X seconds. This period X can be as short as 0 seconds, or as long as several minutes (e.g., 6 minutes) depending upon the application. If the hysteresis test if passed, then the software switches the mode of the interface to 10BaseT if the interface is not already in the 10BaseT mode 46. If the hysteresis test is not passed, then the software returns to monitoring the counters 41. Once the mode is switched (or not depending upon in which mode the interface is during step 46), the process returns to monitoring the counters 41. Returning to step 42, if the counters remain unchanged, the process determines the interface is in the idle mode, and applies optional hysteresis 43, in which the software tests whether the counter has not changed in Y seconds. This time period Y can be as short as 0 seconds or as long as several minutes or hours, depending upon the application. If the hysteresis test is not passed 43, then the process returns to monitoring the counters 41. If the hysteresis test is passed 43, then the process switches to the 10BaseT mode if the current mode is 100BaseT.

Figure 5:
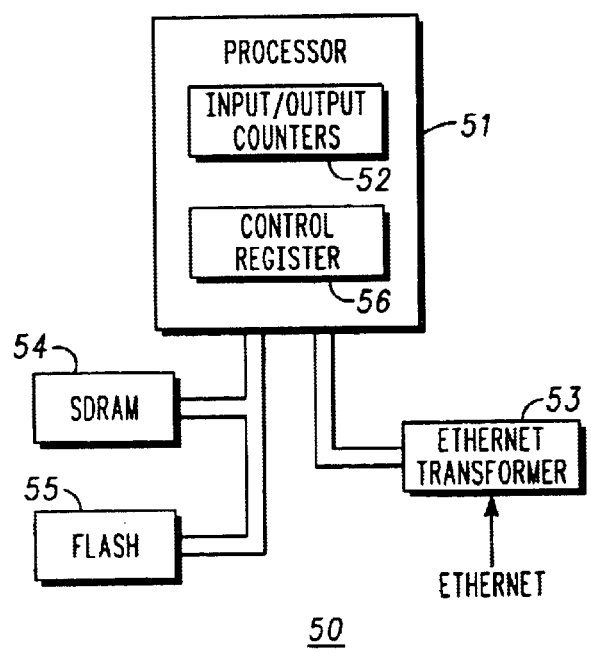
FIG. 5 depicts an exemplary embodiment of an apparatus for performing the methods of FIGS. 2–4 according to another aspect of the present invention.

FIG. 5 depicts an exemplary embodiment of an apparatus 50 for performing the above methods according to yet another aspect of the present invention. The apparatus includes a processor 51, memory 54, 55, an Ethernet interface 53 and input/output counters 52. The processor is a MIPS 300 class process, such as a BCM 3350 manufactured by Broadband. Other processors may suffice. This processor includes an internal counter for the input and output. However, an external counter may also suffice. The Ethernet interface provides the Ethernet input to the processor, which updates the counters. The firmware is embedded in the flash memory 55 and executed from the SDRAM 54. The SDRAM is a 8 Megabyte memory, whereas the Flash memory is a 4 Megabyte memory. Other sizes may suffice, however. The processor includes a control register 56 that determines the speed mode of the communications interface. Upon determining that a change in speed is appropriate, the processor updates the control register 56 with the value associated with the proper speed to which the processor has determined to change.

Although various embodiments are specifically illustrated and described herein, it will be appreciated that modifications and variations of the invention are covered by the above teachings and within the purview of the appended claims without departing from the spirit and intended scope of the invention. For example, while several of the embodiments depict the use of specific communication modes (e.g., 10BaseT, 100BaseT) other modes may suffice. Moreover, while some of the embodiments describe only two modes, multiple modes may be used, in which case the switching can occur from a higher speed mode to a lower speed mode or to the lowest speed mode, depending upon the application. In addition, the switching may occur in steps from a higher speed mode to a lower speed mode, as the level of activity continuously decreases or remains inactive. On the increasing speed situation, the switching can occur in steps from a lower speed mode to a higher speed mode as demand for additional transmission increases or remains constant. Such gradual switching between modes could provide accommodation to user activity as well as assurance that only the highest power consuming modes are used as needed. In addition, such gradual switching could provide less power strain on the power source that might otherwise be caused by rapid switching from a very low speed mode to an extremely high-speed mode, particularly in low voltage applications. Furthermore, these examples should not be interpreted to limit the modifications and variations of the invention covered by the claims but are merely illustrative of possible variations.

What is claimed is:

1. A method for controlling an interface between a processor and a network comprising:

monitoring data traffic from both a processor side and a network side;

detecting a predetermined period of no data traffic on both sides;

disabling an auto-negotiation mode of the interface;

forcing the interface to operate at its lowest speed; and removing briefly a link signal to allow a peer to adapt to the lowest speed.

2. A method for controlling an interface between a processor and a network comprising:

monitoring data traffic from both a processor side and a network side;

detecting a predetermined period of no data traffic on both sides;

disabling an auto-negotiation mode of the interface;

forcing the interface to operate at its lowest speed; and electrically isolating the network from the interface to allow a peer to adapt to the lowest speed.

3. The method according to claim 1, further comprising monitoring when in low speed mode, data on both the processor side and the network side.

4. The method according to claim 3, further comprising upon detecting a predetermined amount or data, enabling the auto-negotiate mode.

5. The method according to claim 4, further comprising removing briefly a link signal to allow a peer to adapt to the lowest speed.

6. The method according to claim 4, further comprising electrically isolating the network from the interface to allow a peer to adapt to the lowest speed.

7. A method for controlling an interface between a processor and a network comprising:

monitoring data traffic from both a processor side and a network side;

detecting a predetermined period of no data traffic on both sides;

disabling an auto-negotiation mode of the interface;

forcing the interface to operate at its lowest speed; and preventing a speed change if a predetermined period has not occurred since a last speed change.

8. A method for controlling an interface between a processor and a network comprising:

monitoring data traffic from both a processor side and a network side;

detecting a predetermined period of no data traffic on both sides;

forcing the interface to operate at its lowest speed;

switching the speed without disabling the auto-negotiation mode; and removing briefly a link signal to allow a peer to adapt to the lowest speed.

9. A method for controlling an interface between a processor and a network comprising:

monitoring data traffic from both a processor side and a network side;

detecting a predetermined period of no data traffic on both sides;

forcing the interface to operate at its lowest speed; and forcing an Ethernet controller to advertise a specific speed and forcing a re-auto-negotiation.

10. A method for controlling an interface between a processor and a network comprising:
   monitoring data traffic from both a processor side and a network side;
   detecting a predetermined period of no data traffic on both sides;
   forcing the interface to operate at its lowest speed; and
   preventing a speed change if a predetermined period has not occurred since a last speed change.

11. A method for controlling an interface between a processor and a network comprising:
   monitoring data traffic from both a processor side and a network side;
   detecting a predetermined period of no data traffic on both sides;
   forcing the interface to operate at its lowest speed; and
   providing some hysteresis in a response to avoid too frequent speed changes.

12. A method for controlling an interface between a processor and a network comprising:
   monitoring data traffic from both a processor side and a network side;
   detecting a predetermined period of no data traffic on both sides;
   forcing the interface to operate at its lowest speed;
   switching the speed without disabling the auto-negotiation mode; and
   electrically isolating the network from the interface to allow a peer to adapt to the lowest speed.

13. The method according to claim 9, further comprising monitoring when in low speed mode, data on both the processor side and the network side.

14. The method according to claim 13, further comprising upon detecting a predetermined amount of data, enabling the auto-negotiate mode.

15. The method according to claim 14, further comprising removing briefly a link signal to allow a peer to adapt to the lowest speed.

16. The method according to claim 14, further comprising electrically isolating the network from the interface to allow a peer to adapt to the lowest speed.

17. A method for controlling a communications interface comprising:
   monitoring a counter on an input side of the communications interface and monitoring a counter on an output side of the communications interface;
   switching to a lower speed mode if detected activity lies below a first threshold for a first predetermined period in both the input and output counters; and
   switching to a higher speed mode if detected activity in either one of the input and output counters exceeds a predetermined threshold for a second predetermined period.

18. The method according to claim 17, wherein the communications interface comprises a plurality of speed modes.

19. The method according to claim 18, where said switching to a lower speed mode includes switching to a next lower speed mode of the plurality of speed modes if not already in a lowest speed mode of the plurality of speed modes.

20. The method according to claim 18, where said switching to a higher speed mode includes switching to a next higher speed mode of the plurality of speed modes if not already in a highest speed mode of the plurality of speed modes.

21. An apparatus for controlling a communications interface having at least two communications speed modes comprising:
   a memory storing a plurality of instructions;
   a network interface coupled to an input and output data line and providing incoming and outgoing data signals;
   an input counter counting a number of incoming data packets;
   an output counter counting a number of outgoing data packets; and
   a processor coupled to the memory, the network interface, the input and output counters, and executing the plurality of instructions stored in the memory, and incrementing said input and output counters based on data packets present in said incoming and outgoing data signals, respectively, from said network interface; said processor further switching the apparatus to a lower speed mode if detected activity lies below a first threshold for a first predetermined period in both the input and output counters and switching to a higher speed mode if detected activity in either one of the input and output counters exceeds a predetermined threshold for a second predetermined period.

22. The apparatus according to claim 21, wherein the communications interface comprises a plurality of speed modes.

23. The apparatus according to claim 22, where said processor switches to a next lower speed mode of the plurality of speed modes if the apparatus is not already in a lowest speed mode of the plurality of speed modes.

24. The apparatus according to claim 22, where said processor switches to a next higher speed mode of the plurality of speed modes if the apparatus is not already in a highest speed mode of the plurality of speed modes.

25. A computer readable media having programming instructions encoded thereon causing a processor to:
   monitor a counter on an input side of the communications interface and monitor a counter on an output side of the communications interface;
   switch to a lower speed mode if detected activity lies below a first threshold for a first predetermined period in both the input and output counters; and
   switch to a higher speed mode if detected activity in either one of the input and output counters exceeds a second predetermined threshold for a second predetermined period.

26. The computer readable media according to claim 25, wherein the communications interface comprises a plurality of speed modes.

27. The computer readable media according to claim 26, where said switching to a lower speed mode includes switching to a next lower speed mode of the plurality of speed modes if not already in a lowest speed mode of the plurality of speed modes.

28. The method according to claim 18, where said switching to a higher speed mode includes switching to a next higher speed mode of the plurality of speed modes if hot already in a highest speed mode of the plurality of speed modes.

* * * * *

UNITED STATES PATENT AND TRADEMARK OFFICE
CERTIFICATE OF CORRECTION

PATENT NO. : 6,791,942 B2
DATED : September 14, 2004
INVENTOR(S) : Yucheng Jin

It is certified that error appears in the above-identified patent and that said Letters Patent is hereby corrected as shown below:

Column 1,
Line 29, after "scenario" change "applied" to -- applies --.

Column 2,
Line 6, change first word "removes", to -- remove --.
Line 41, after "input", change "an" to -- and --.

Column 3,
Line 67, before "direction", change "ether" to -- either --.

Column 4,
Line 29, change first word "applied" to -- applies --.

Column 5,
Line 12, after "10BaseT mode is", change "no" to -- not --.
Lines 54-56, change "For example, the amount of data could be a single packet in the predetermined time is sufficient to maintain the high-speed mode," to -- For example, the amount of data sufficient to maintain the high-speed mode could be a single packet in the predetermined time --.

Column 7,
Line 5, after "hysteresis test", change "if" to -- is --.

Column 8,
Line 31, after "amount", change "or" to -- of --.

UNITED STATES PATENT AND TRADEMARK OFFICE
CERTIFICATE OF CORRECTION

PATENT NO. : 6,791,942 B2
DATED : September 14, 2004
INVENTOR(S) : Yucheng Jin

It is certified that error appears in the above-identified patent and that said Letters Patent is hereby corrected as shown below:

Column 10,
Line 63, after "if", change "hot" to -- not --.

Signed and Sealed this

Twenty-ninth Day of March, 2005

JON W. DUDAS
*Director of the United States Patent and Trademark Office*